(12) United States Patent
Hirosawa (10) Patent No.: US 6,947,296 B2
(45) Date of Patent: Sep. 20, 2005

(54) SWITCHING POWER SUPPLY CIRCUIT AND ELECTRONIC DEVICE

(75) Inventor: Hideki Hirosawa, Fujioka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/462,828

(22) Filed: Jun. 17, 2003

(65) Prior Publication Data

US 2004/0052092 A1  Mar. 18, 2004

(30) Foreign Application Priority Data

Jun. 17, 2002  (JP) .................................... 2002-175612

(51) Int. Cl.$^7$ ............................................ H02M 3/335
(52) U.S. Cl. ...................... 363/20; 363/56.09; 363/97
(58) Field of Search ............................ 363/20, 56.09, 363/97

(56) References Cited

U.S. PATENT DOCUMENTS 6,341,075 B2 * 1/2002 Yasumura ................ 363/21.02
6,366,476 B1 * 4/2002 Yasumura ................ 363/21.02
6,542,387 B2 * 4/2003 Tsuge ...................... 363/21.01

FOREIGN PATENT DOCUMENTS

| JP | 3-3134 | 1/1991 | ............ H02H/7/12 |
| JP | 8-182315 | 7/1996 | ............ H02M/3/28 |
| JP | 2001-298860 | 10/2001 | ............ H02J/1/00 |
| JP | 2002-51551 | 2/2002 | ............ H02M/3/28 |

\* cited by examiner

Primary Examiner—Jeffrey Sterrett
(74) Attorney, Agent, or Firm—Pillsbury Winthrop Shaw Pittman, LLP (57) ABSTRACT

A surge voltage detection circuit compares a stipulated voltage $V_S$ with the drain voltage of a switching element, the drain voltage being applied by a smoothing capacitor. The comparison result is supplied to a switching control circuit. If the drain voltage of the switching element is higher than the stipulated voltage $V_S$, the switching control circuit inhibits the operation of the switching element. As a result, no switching operation is started, and the drain voltage of the switching element does not exceed the breakdown voltage of the element.

2 Claims, 8 Drawing Sheets

SWITCHING POWER SUPPLY CIRCUIT AND ELECTRONIC DEVICE

CROSS-REFERENCE TO RELATED APPLICATIONS

This application is based upon and claims the benefit of priority from the prior Japanese Patent Application No. 2002-175612, filed Jun. 17, 2002, the entire contents of which are incorporated herein by reference.

BACKGROUND OF THE INVENTION

1. Field of the Invention

The present invention relates to a switching power supply circuit for converting an AC power supply voltage to a DC power supply voltage, and more particularly to a switching power supply circuit preferably used as a standby power supply circuit and capable of protecting a switching element from a surge voltage.

2. Description of the Related Art

Most electronic devices, such as television sets, are provided with a main power supply circuit for operating each element in the main unit, and a standby power supply circuit for continuously operating standby circuits, such as a light receiving circuit for receiving a signal from a remote controller, a microcomputer, etc.

Standby power supply circuits usually have a rectifier circuit connected to an AC power supply, and continuously provide a relatively low power supply voltage (e.g. about 5V) for the above-mentioned light receiving circuit and microcomputer. When the remote controller has instructed the light receiving circuit to turn on the electronic device, the main power supply circuit is operated under the control of the microcomputer. On the other hand, when the remote controller has instructed the light receiving circuit to turn off the device, the operation of the main power supply circuit is stopped under the control of the microcomputer.

There is a recent tendency to use a switching power supply circuit as the standby power supply circuit. Switching power supply circuits usually comprise a rectifier circuit connected to an AC power supply, a smoothing capacitor for smoothing the output of the rectifier circuit, a converter transformer supplied with a DC current from the smoothing capacitor, and a switching element to which a DC current is supplied from the smoothing capacitor via the primary winding of the transformer. The ON/OFF of the switching element is controlled by the output of a switching control circuit. During the OFF period of the switching element, the energy accumulated in the above-mentioned primary winding is transmitted to the secondary winding of the transformer. The voltage generated at the secondary winding is rectified into a DC output voltage.

The ON/OFF cycle (duty ratio) of the switching element is controlled in accordance with variations in the DC output voltage, thereby stabilizing the DC output voltage of the power supply circuit.

If the switching power supply circuit is used as a standby power supply circuit, the capacitance of the smoothing capacitor is usually set small, compared to that of the main power supply. This is to reduce the size of the standby power supply circuit, and also to enhance the responsiveness with which the microcomputer detects whether the supply of power is restored, if it has failed for a short time.

If the smoothing capacitor has a small capacitance, a surge voltage may occur due to the reactance component of the AC power supply line when the AC power supply has been turned on, thereby significantly increasing the voltage across the smoothing capacitor. If the capacitance is large, the capacitor can absorb voltage surges. If, on the other hand, the capacitance is small, the capacitor cannot absorb a surge voltage, with the result that circuits connected to this capacitor may be affected by transient high voltages.

The switching control circuit incorporated in a switching power supply circuit includes an oscillation circuit, which oscillates when the terminal voltage of the smoothing capacitor exceeds a predetermined value after turn-on of the power supply. If the surge voltage is higher than the breakdown voltage of the switching element, the surge voltage may damage the switching element.

To prevent this, it is necessary to increase the capacitance of the smoothing capacitor so that it can absorb surge voltages. However, if this is done, the responsiveness of the microcomputer is reduced to low, therefore the microcomputer cannot quickly detect the restoration of power supply if the power supply has failed for a short time. If the main power supply circuit supplies an operation voltage to each element of the main unit before the microcomputer operates, the main unit may malfunction. Further, if a surge absorption element is inserted between the AC power supply and the rectifier circuit, current continuously flows through the surge absorption element, resulting in an increase in power consumption.

Japanese Patent Application KOKAI Publication No. 2002-51551 discloses a technique for varying the smoothing capacitance of a switching power supply circuit in accordance with the load, such that the smoothing capacitance is reduced in a standby mode, and the ON/OFF of a switching element is controlled only when the input voltage is lower than a predetermined value. This publication, however, contains no description concerning protection from a rapid increase in the voltage applied to the smoothing capacitor.

As described above, if a switching power supply circuit is used as a standby power supply, it is necessary to reduce the capacitance of the smoothing capacitor, but doing so, however, involves the risk that surge voltages may increase the breakdown voltage of the switching element and damage the element.

BRIEF SUMMARY OF THE INVENTION

According to an aspect of the invention, there is provided a switching power supply circuit comprising: a direct-current-voltage generating circuit which generates an input direct-current voltage, the direct-current-voltage generating circuit including a rectifier circuit which rectifies an alternating-current power supply voltage, and a smoothing capacitor which smoothes an output from the rectifier circuit; a converter transformer having primary and secondary windings, the input direct-current voltage being applied to an end of the primary winding; a switching element having a main current path and a control electrode, the main current path being connected between another end of the primary winding and a reference potential point, the switching element being turned on/off in response to a switching signal supplied to the control electrode; an output circuit which rectifies a voltage across the secondary winding of the converter transformer, thereby applying an output direct-current voltage to a load; a switching control circuit which has an oscillation circuit, and supplies the switching element with the switching signal on a basis of an oscillation operation of the oscillation circuit; and an oscillation control circuit having a comparator circuit which compares a first stipulated voltage with the input direct-current voltage applied to the switching element, the oscillation control circuit prohibiting an operation of the oscillation circuit of the switching control circuit if the input direct-current voltage is higher than the first stipulated voltage.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
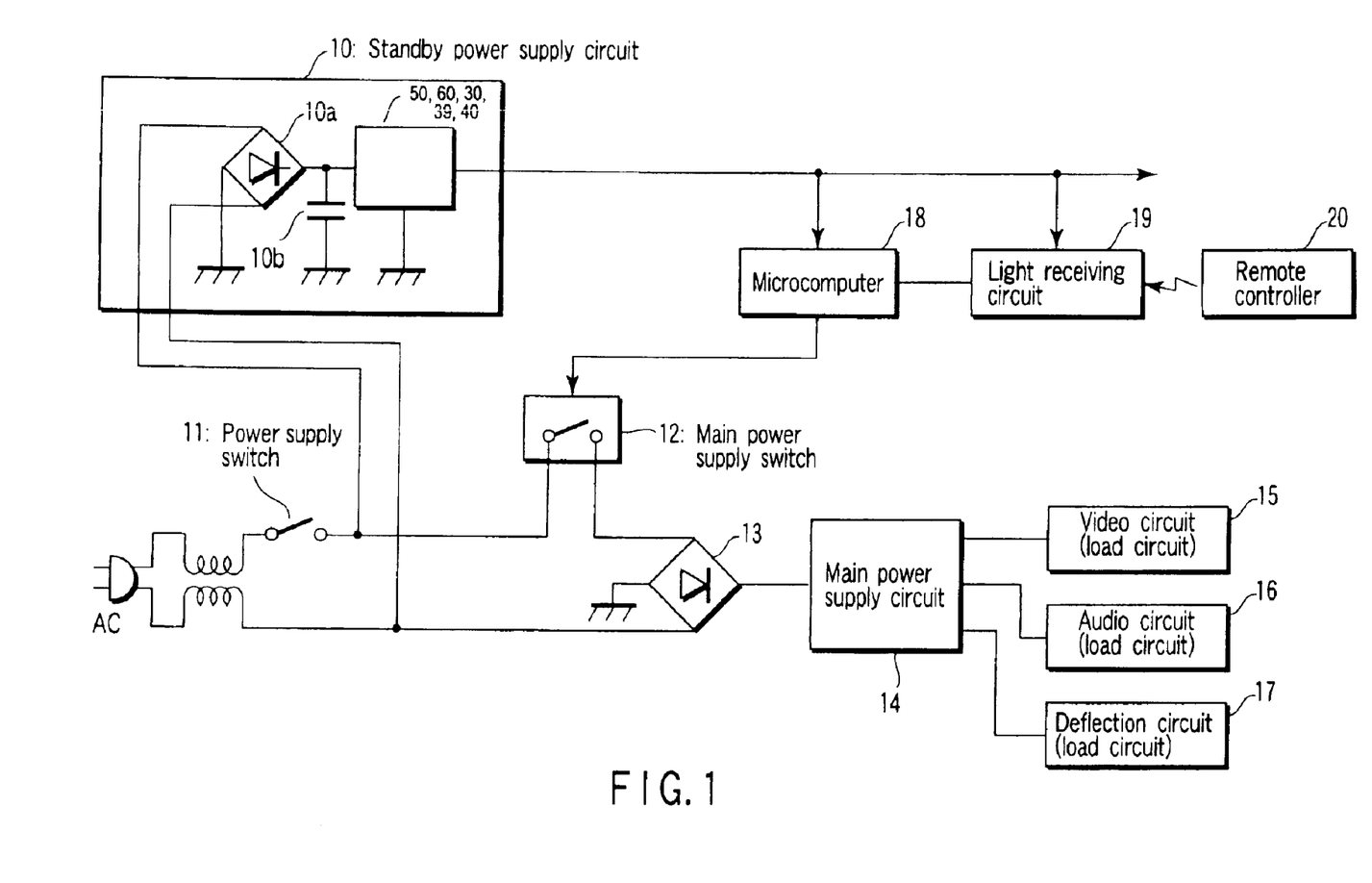
FIG. 1 is a block diagram illustrating the entire configuration of an electronic device incorporating a switching power supply circuit according to embodiments of the invention.

The structures of switching power supply devices and electronic devices according to the invention will be described with reference to the accompanying drawings. FIG. 1 is a block diagram illustrating the entire configuration of an electronic device according to the invention, specifically, a power supply system for a television set.

A power supply switch 11 is a manual switch for turning on/off the supply of an AC power supply voltage of, for example, 100V from a commercial AC power supply. When the power supply switch 11 has been switched on, power is supplied to a standby power supply circuit 10, thereby applying, for example, 5V to a microcomputer 18 and light receiving circuit 19. The standby power supply circuit 10 is a switching power supply. The microcomputer 18 is powered by the standby power supply circuit 10. When a remote controller 20 has generated a power supply ON signal, the light receiving circuit 19 receives the signal and outputs it to the microcomputer 18, thereby switching on a main power supply switch 12.

When the main power supply switch 12 has been switched on, an AC power supply voltage is applied to a rectifier circuit 13 via the main power supply switch 12. The rectifier circuit 13 rectifies the AC power supply voltage into a DC voltage, and outputs it to a main power supply circuit 14.

The main power supply circuit 14 comprises, for example, a switching power supply circuit. The main power supply circuit 14 inputs a DC voltage from the rectifier circuit 13, and applies respective appropriate DC voltages to load circuits, such as a video circuit 15, audio circuit 16, deflection circuit 17, etc.

On the other hand, when the remote controller has generated a power supply OFF signal, the light receiving circuit 19 switches off the main power supply switch 12. The main power supply switch 12 comprises, for example, a relay.

When the main power supply switch 12 has been switched off, the supply of power to the rectifier circuit 13 and main power supply circuit 14 is stopped. As a result, the supply of DC the power supply voltages to the load circuits 15, 16 and 17 is also stopped. Even if the operation of the main power supply circuit 14 is stopped, the standby power supply circuit 10 continues to supply power to standby circuits such as the microcomputer 18, light receiving circuit 19, etc. unless the power supply switch 11 is switched off.

When a user has pushed the power ON button of a remote controller 20, a power ON signal is transmitted to the microcomputer 18 via the light receiving circuit 19. The microcomputer 18 switches on a main power supply switch 12, thereby causing the main power supply circuit 14 to re-start the supply of power to the load circuits 15, 16 and 17.

Figure 2:
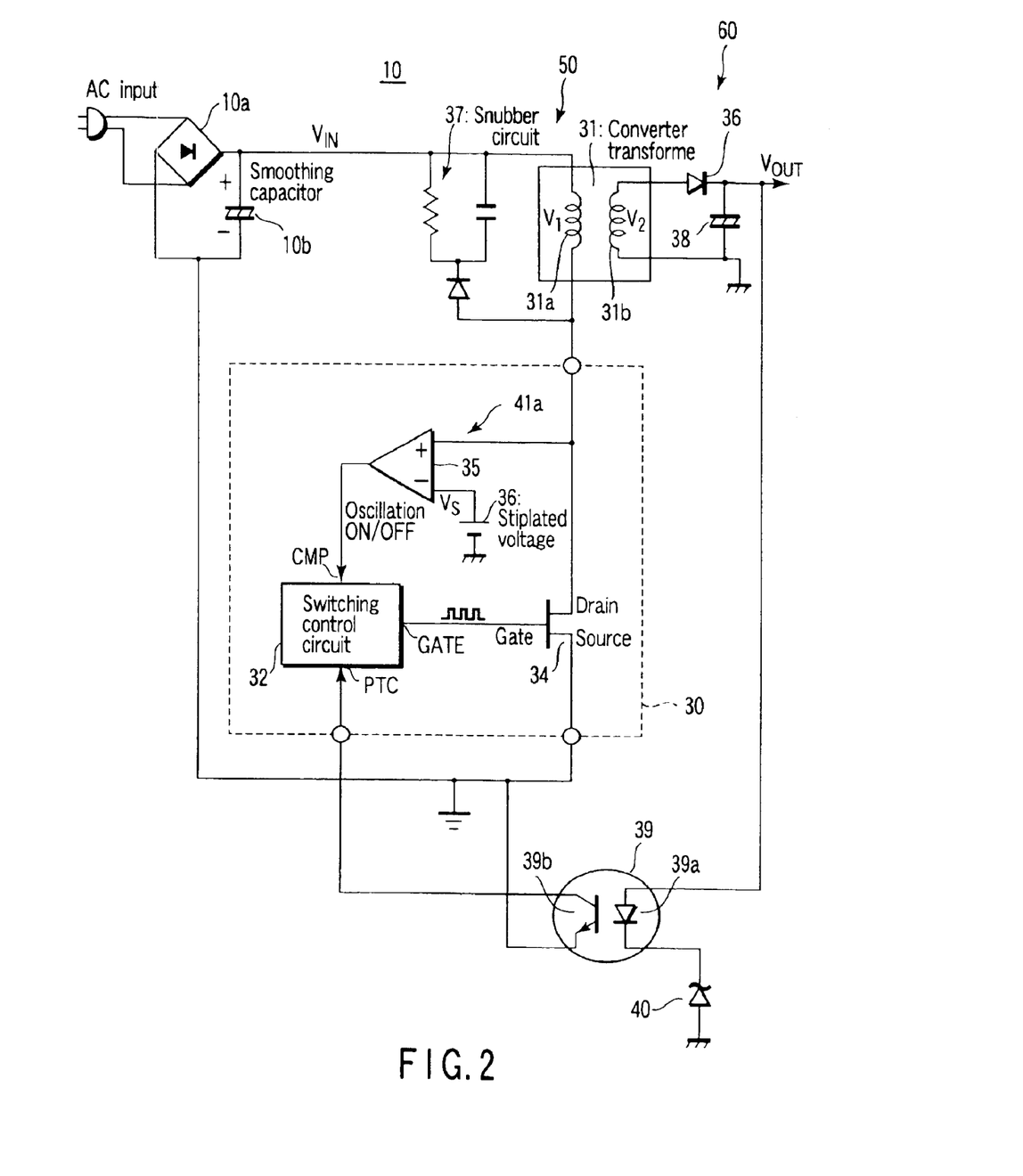
FIG. 2 is a circuit diagram illustrating a standby power supply circuit as a switching power supply circuit according to a first embodiment of the invention.

FIG. 2 is a circuit diagram illustrating the standby power supply circuit 10, according to the first embodiment of the invention, employed in the above-described electronic device.

The standby power supply circuit 10 comprises an input-side power supply circuit 50 and output-side power supply circuit 60. The input-side power supply circuit 50 has a rectifier circuit 10a for rectifying an AC voltage from a commercial power supply (AC input), and a smoothing capacitor 10b for smoothing the output voltage of the rectifier circuit 10a. The DC input voltage $V_{IN}$ generated across the smoothing capacitor 10 is applied to an end of the primary winding 31a of a converter transformer 31.

The other end of the primary winding 31a of the converter transformer 31 is connected to the drain of a MOSFET (hereinafter referred to simply as a "FET") 34 functioning as a switching element. The gate of the FET 34 is connected to the GATE terminal of a switching control circuit 32 so that the switching operation of the FET 34 is controlled by the control circuit 32. The source terminal of the FET 34 is connected to a reference potential point (earth) as the other end of the smoothing capacitor 10b. The drain-source current path of the FET 34 serves as a main current path, and its gate terminal serves as a control input terminal.

A snubber circuit 37 is connected parallel to the primary winding 31a of the converter transformer 31 to prevent a voltage higher than the drain/source breakdown voltage of the FET 34 from being applied thereto during its switching operation.

The block 30 indicated by the broken line in FIG. 2 is formed of an IC (Integrated Circuit). In the embodiment, the FET 34 is incorporated in the IC 30. However, the FET 34 may be provided outside the IC 30. The IC 30 further incorporates the previously mentioned switching control circuit 32 and a surge voltage detection circuit 41a. The surge voltage detection circuit 41a is provided for interrupting the operation of the switching control circuit 32 to protect the FET 34 when a surge voltage has occurred in the input voltage $V_{IN}$.

The switching control circuit 32 generates, at the GATE terminal, an oscillation pulse output for performing switching control on the FET 34. With this structure, the FET 34 is turned on/off, energy is accumulated at the primary winding 31a side of the converter transformer 31 during the OFF period of the FET 34, and energy is discharged to the secondary winding 31b side during the ON period of the FET 34. As a result, the primary and secondary windings 31a and 31b generate AC voltages V1 and V2 having opposite polarities, respectively. The AC voltage V2 is rectified by a diode 36, smoothed by a smoothing capacitor 38, and supplied as a power supply voltage $V_{OUT}$ to the standby circuit incorporating, for example, a microcomputer as a secondary-side load circuit.

The PTC terminal of the switching control circuit 32 is connected to the output terminal of a photocoupler 39, which is operated by a feedback signal from the output-side power supply circuit 60. The photocoupler 39 comprises a light-emitting diode 39a and phototransistor 39b, providing a feedback circuit for supplying a feedback signal from the output-side power supply circuit 60 to the input-side power supply circuit 50. The emission diode 39a forms the light emission section of the photocoupler 39, and the phototransistor 39b forms the light receiving section.

The cathode of the rectifier diode 36 is connected to the anode of the light-emitting diode 39a is connected to the reference potential point via a zener diode 40. The collector of the photo transistor 39b is connected to the PTC terminal of the switching control circuit 32, and the emitter of the diode 39b is connected to the reference potential point.

With this structure, if, for example, the output voltage $V_{OUT}$ is higher than a predetermined voltage $V_T$ determined by the zener diode 40, the light-emitting diode 39a is turned on. When the turn-on of the light-emitting diode 39a has been turned on, the light emitted therefrom turns on the phototransistor 39b. As a result, the voltage at the PTC terminal of the switching control circuit 32 is dropped to LOW, thereby causing the oscillation circuit of the switching control circuit 32 to reduce the output voltage $V_{OUT}$. The output voltage $V_{OUT}$ is controlled to a constant low value by, for example, reducing the oscillation frequency or shortening the switch ON period. Conversely, if the output voltage $V_{OUT}$ becomes low, the light-emitting diode 39a is turned off, thereby turning off the phototransistor 39b. As a result, the voltage at the PTC terminal increases to HIGH, thereby causing the oscillation circuit of the switching control circuit 32 to increase the output voltage $V_{OUT}$. The output voltage $V_{OUT}$ is controlled to a constant high value by, for example, increasing the oscillation frequency or lengthening the switch ON period.

Figure 3:
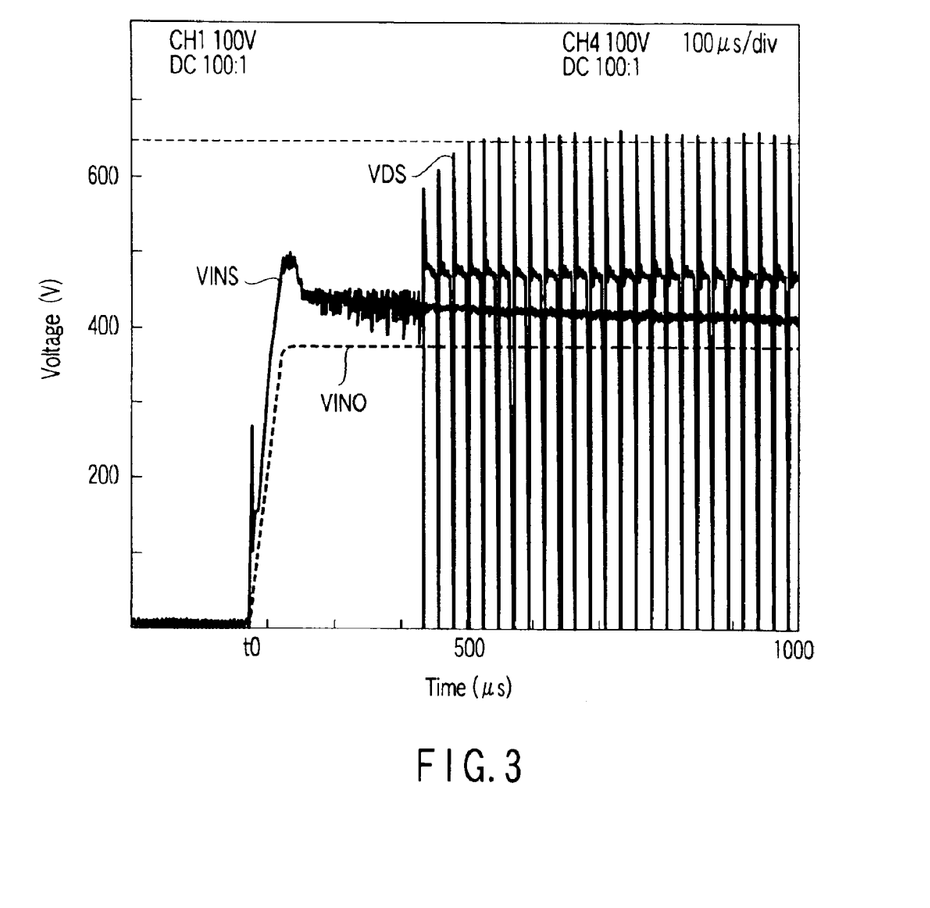
FIG. 3 is a graph illustrating the relationship between input voltage $V_{IN}$ and the drain voltage of a FET.

FIG. 3 is a graph illustrating the relationship between input voltage $V_{IN}$ and the drain voltage $V_D$ of a FET. The power supply switch 11 is turned on at a time point t0, and the FET 34 starts its switching operation approx. 250 µs after.

The input voltage $V_{INO}$ indicated by the broken line expresses the voltage waveform produced when an input AC voltage of 270V has normally increased. Thus, the normal input voltage $V_{INO}$ has a waveform in which the peak value (approx. 382V=AC270×√2) of the input AC voltage is maintained. However, a surge may occur in the input voltage $V_{INO}$ because of power supply voltage fluctuation, inrush current at the start of power supply, lightning strike, etc. When such a surge has occurred, the input voltage reaches 500V or more as indicated by $V_{INS}$.

The voltage $V_{DS}$ indicates the drain voltage of the FET 34 when a surge has occurred in the input voltage $V_{IN}$. In the case of FIG. 3, the drain voltage $V_{DS}$ reaches 650V or more in a moment of time. Thus, when a surge has occurred in the input voltage $V_{IN}$ and a switching operation has been started, the drain voltage is much higher than when no surge voltage occurs. This means that an increase in the drain voltage degrades or damages a FET usually used as a standby power supply.

To avoid it, the embodiment is characterized in that the drain voltage $V_D$ of the FET 34 is continuously monitored by the surge voltage detection circuit 41a, and the switching control circuit 32 is controlled on the basis of the monitoring result of the detection circuit 41a. Specifically, when the power supply switch 11 has been turned on (in this state, the standby power supply circuit 10 is not switched on), if the drain voltage $V_D$ is higher than a stipulated value, the oscillation circuit of the switching control circuit 32 prohibits or stops oscillation, thereby outputting no pulse train from the GATE terminal, with the result that the FET 34 does not start a switching operation. Thus, the switching control circuit 32 drops, to 0V, the level of the control output signal supplied to the FET 34, thereby prohibiting the operation of the FET 34.

The surge voltage detection circuit 41a comprises a comparator 35 and stipulated voltage generating section 36. The drain voltage $V_D$ of the FET 34 is applied to the non-inverting input terminal of the comparator 35, while a stipulated voltage $V_S$ from the stipulated voltage generating section 36 is input to the inverting input terminal of the comparator 35. The output of the comparator 35 is supplied to the CMP terminal of the switching control circuit 32.

When, for example, a surge voltage has occurred in the input voltage $V_{IN}$ upon the supply of power, the drain voltage $V_D$ (this is a DC voltage) becomes higher than the stipulated voltage $V_S$, and the output of the comparator 35 becomes HIGH. In Japan, the stipulated voltage $V_S$ is set to, for example, approx. 170V (in Europe (AC voltage=230V), it is set to approx. 382V). This being so, the switching control circuit 32 does not generate a pulse-train signal from the GATE terminal, with the result that the FET 34 does not execute a switching operation, and the primary winding of the converter transformer 31 does not generate the AC voltage V1.

As described above, in the embodiment, the input DC voltage $V_{IN}$ across the smoothing capacitor 10b is detected upon the supply of power, thereby controlling the switching control circuit 32 so that oscillation is started if the input DC voltage $V_{IN}$ is not higher than a stipulated value, and is prohibited if the voltage $V_{IN}$ is higher than the stipulated value. Accordingly, oscillation is inhibited if the drain voltage $V_D$ may exceed the breakdown voltage of the switching element FET 34. Thus, the detection of the drain voltage $V_D$ before the switching element starts oscillation enables the switching element to be protected from an excessive breakdown voltage due to a great increase in the primary smoothing capacitor voltage caused by an increase in the AC input power supply voltage or a surge voltage.

The above-described configuration may be modified such that a stipulated voltage $V_{S1}$ is applied to the non-inverting input terminal of the comparator 35, and the input DC voltage $V_{IN}$ is applied to the inverting input terminal of the comparator. In this case, the polarity of the output of the comparator 35 is inverted with respect to that of the previous configuration. However, this will raise no problems if the switching control circuit 32 is modified to respond to the polarity-inverted output.

Figure 4:
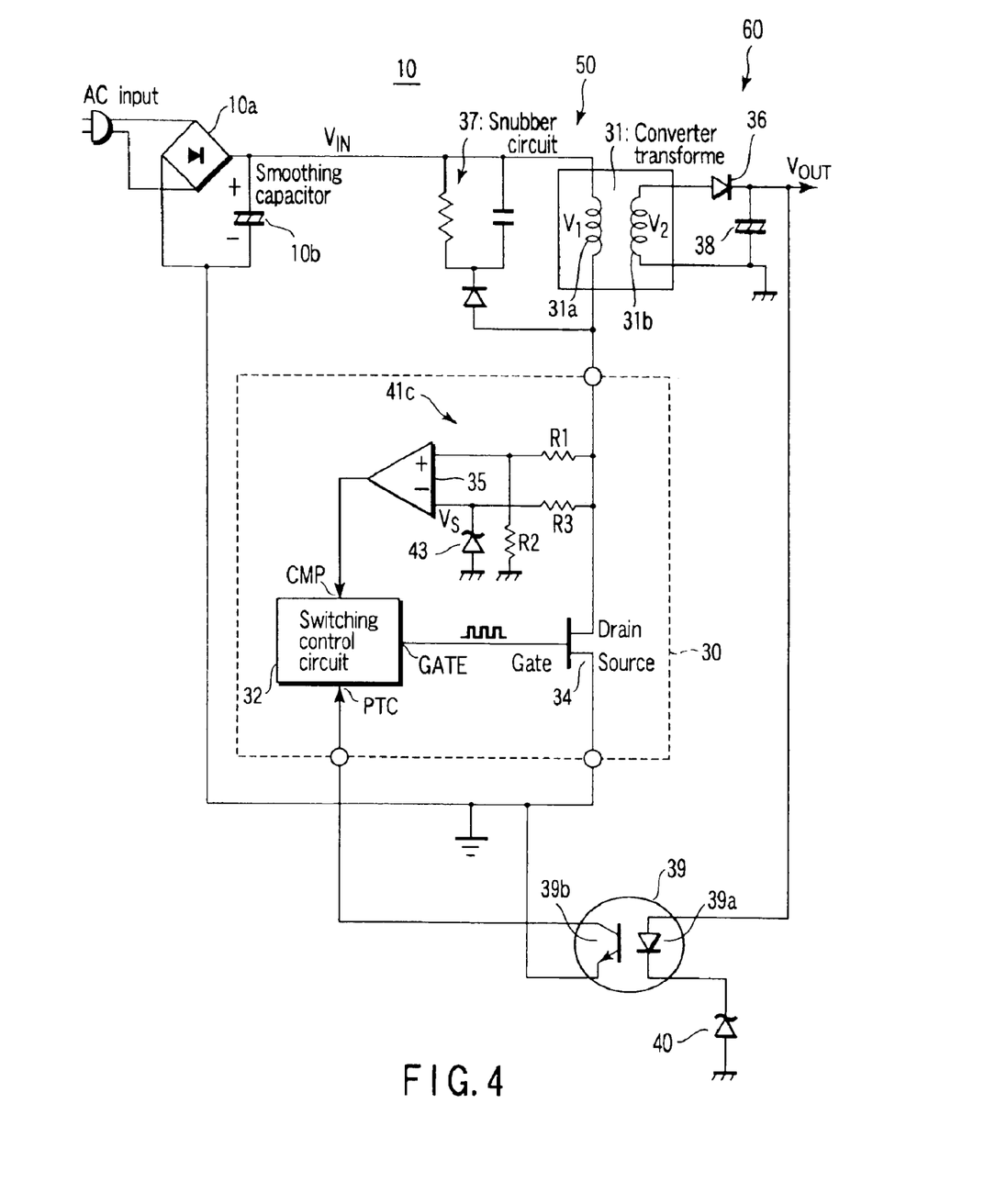
FIG. 4 is a view illustrating a modification of the first embodiment.

FIG. 4 shows a modification of the first embodiment. In the first embodiment, since the drain voltage VD is input to the comparator 35, the comparator 35 must be a high breakdown voltage comparator, and the stipulated voltage generating section 36 must generate a high voltage.

On the other hand, in the modification shown in FIG. 4, the voltage produced by dividing the drain voltage $V_D$ by resistors R1 and R2 is input to the non-inverting input terminal of the comparator 35, while the voltage produced by reducing the drain voltage $V_D$ using a resistor R3 and zener diode 42 is input to the inverting input terminal of the comparator 35. Accordingly, this modification is advantageous in that it does not need a high breakdown comparator or high-voltage generating section.

Figure 5:
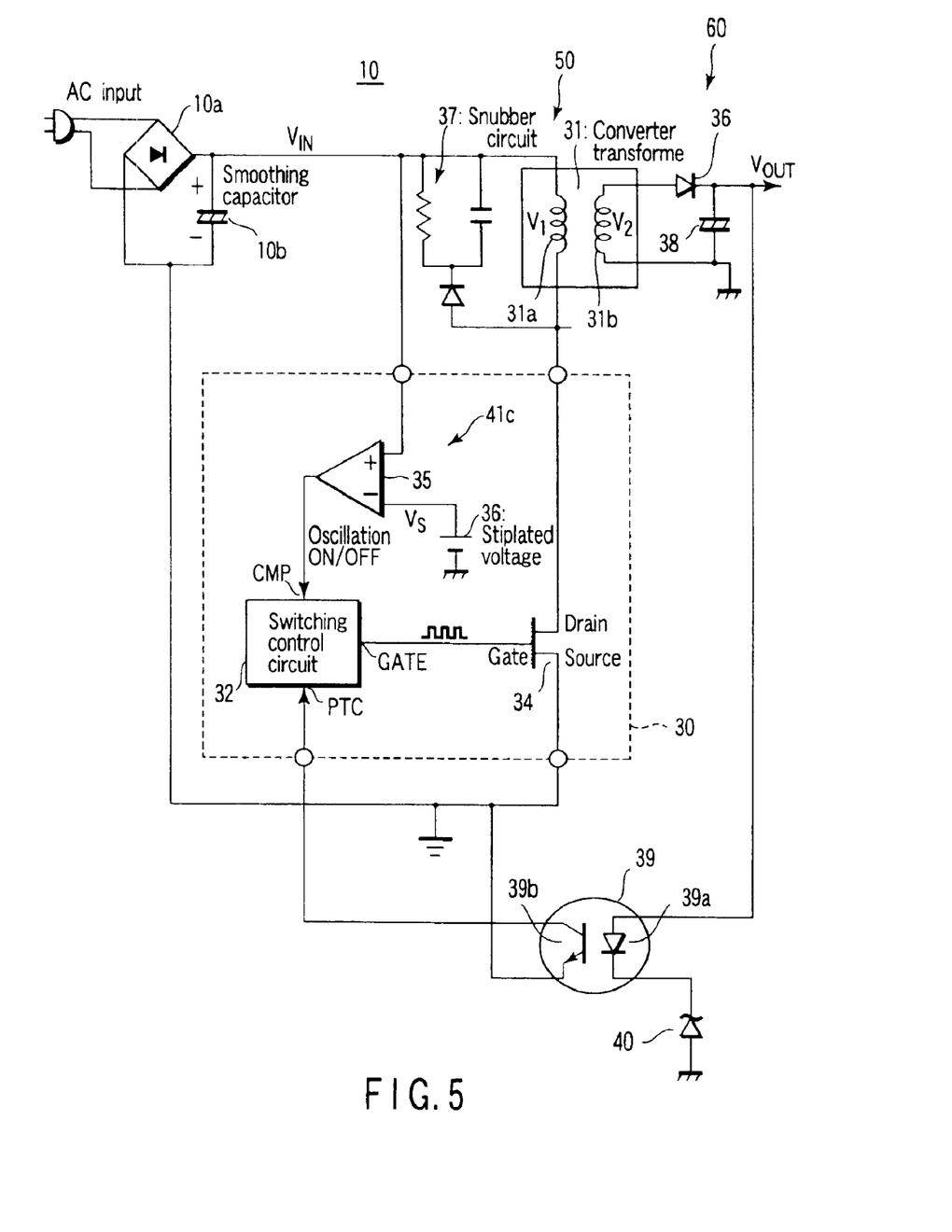
FIG. 5 is a circuit diagram illustrating a standby power supply circuit according to a second embodiment of the invention.

FIG. 5 shows a surge voltage detection circuit 41c according to a second embodiment of the invention. This embodiment is characterized in that the non-inverting input terminal of the comparator 35 is connected to an end of the smoothing capacitor 10a so that the input voltage $V_{IN}$ is input to thereto. The stipulated voltage $V_S$ is input to the inverting input terminal of the comparator 35 as in the first embodiment.

In the embodiment shown in FIG. 2, a surge voltage is mainly detected during the time ranging from the turn-on of the device to the start of a switching operation by the FET 34. During the switching operation, the occurrence of a surge voltage may not accurately be detected since the drain voltage $V_D$ differs from the input DC voltage $V_{IN}$.

On the other hand, in the embodiment of FIG. 5, since the voltage applied to one terminal of the smoothing capacitor 10b, i.e., the input voltage $V_{IN}$, is directly monitored, a reliable detection operation can be performed even during the switching operation, therefore the occurrence of a surge voltage in the input DC voltage $V_{IN}$ can be accurately detected.

Figure 6:
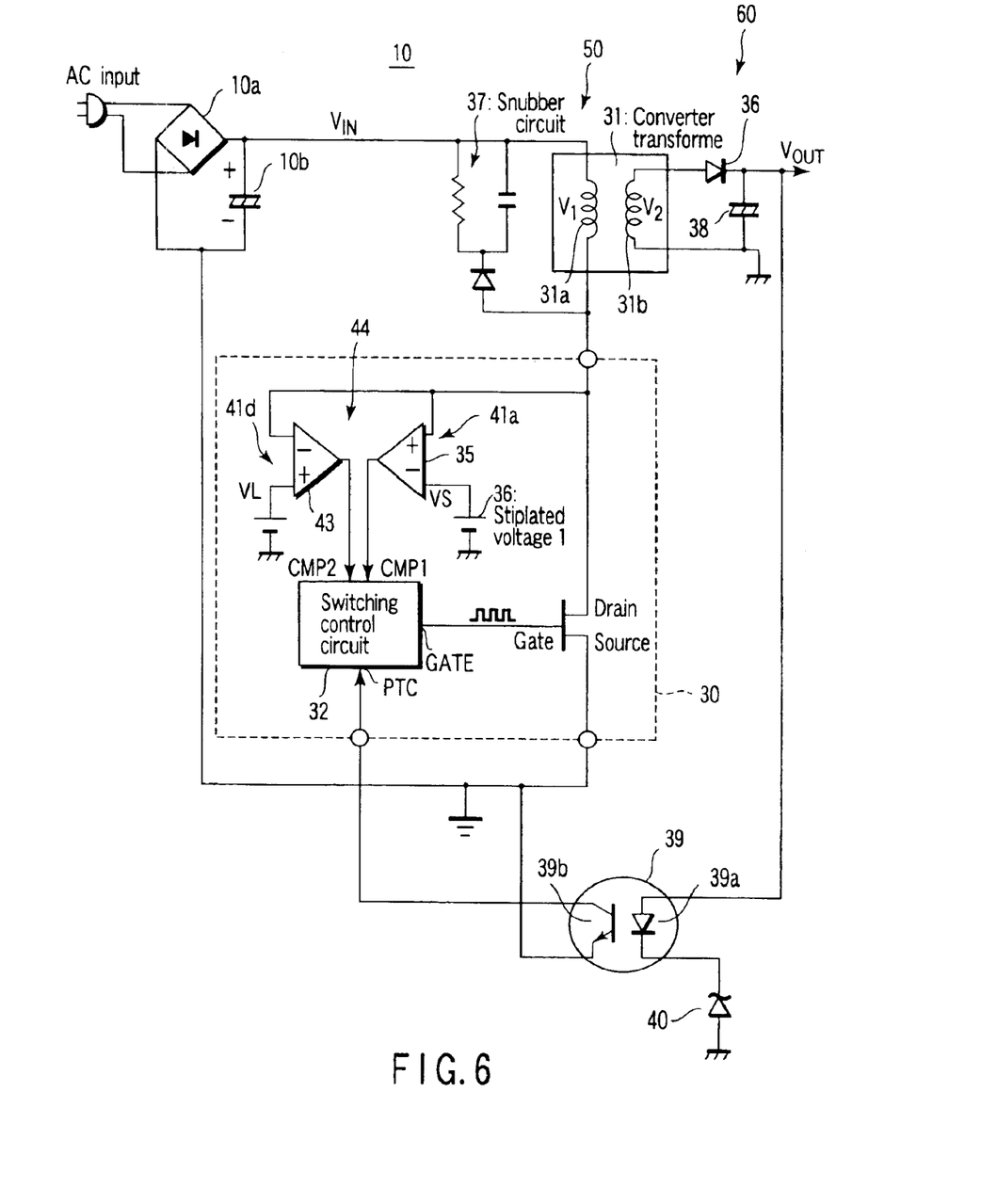
FIG. 6 is a circuit diagram illustrating a standby power supply circuit according to a third embodiment of the invention.
Figure 7:
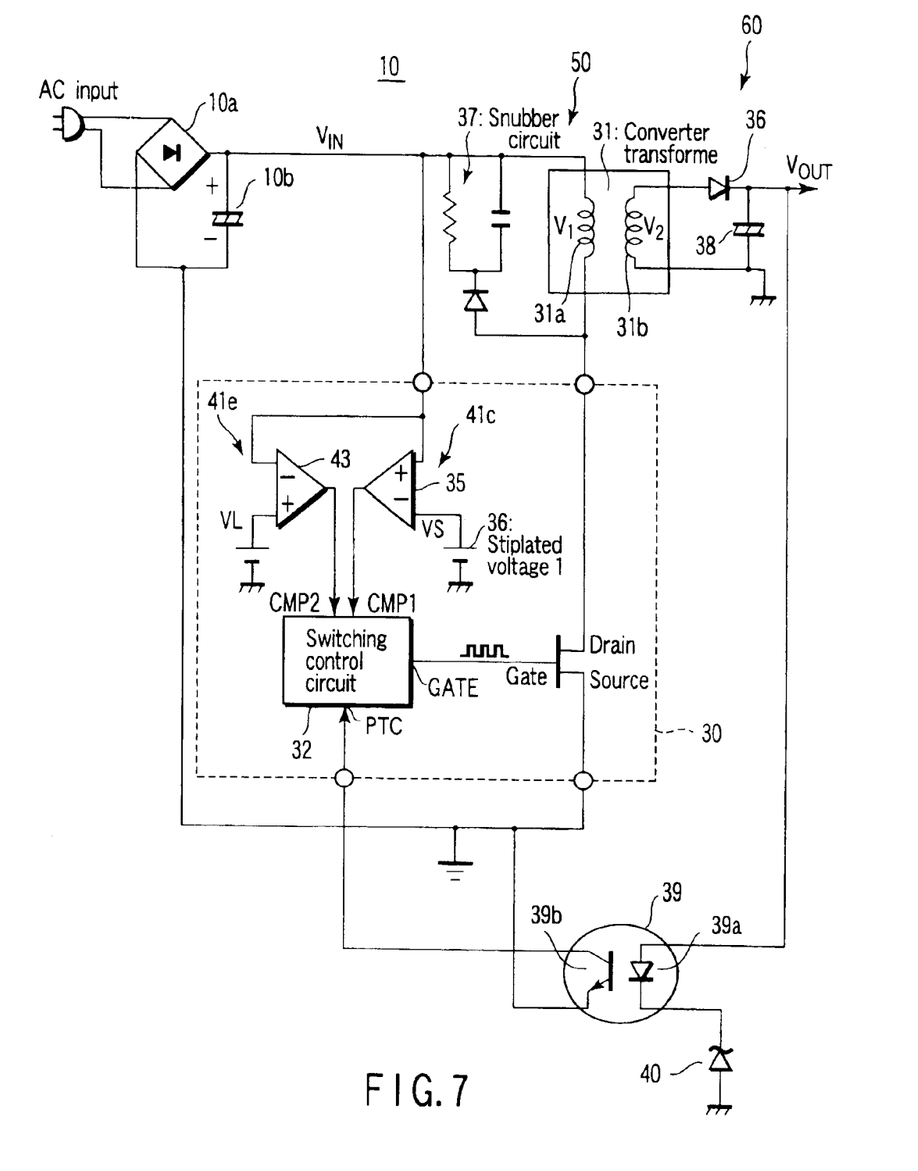
FIG. 7 is a circuit diagram illustrating a standby power supply circuit according to a modification of the third embodiment of the invention.

FIGS. 6 and 7 show voltage detection circuits 44 according to a third embodiment of the invention. In the example shown in FIG. 6, a low voltage detection circuit 41d is provided as well as the surge voltage detection circuit 41a. The low voltage detection circuit 41d comprises a comparator 43 having a non-inverting input terminal to which a voltage $V_L$ is input, and an inverting input terminal to which the input DC voltage $V_{IN}$ is input. The output of the comparator 35 is connected to a terminal CMP1 of the switching control circuit 32, while the output of the comparator 43 is connected to the other terminal CMP2 of the circuit 32. In this embodiment, if the AC input power supply voltage is within a predetermined voltage range, the standby power supply is turned on to thereby turn on the main power supply switch 12.

Specifically, the input power supply voltage range for the standby power supply circuit can be easily widened since the output power of the standby power supply circuit is low. For example, the input power supply voltage range can deal with input voltages ranging from AC 270V to AC 70V. This AC voltage range corresponds to a DC voltage range of 382V (270*$\sqrt{2}$) –99V (70*$\sqrt{2}$). On the other hand, the input power supply voltage range for the main power supply circuit 14 cannot easily be widened since the output power is high. The range is, for example, from AC 270V to AC 170V, i.e., from DC 382V (270*$\sqrt{2}$) to DC 240V (170*$\sqrt{2}$). If a voltage falling out of this range is input to the main power supply circuit 14, the circuit degrades, therefore additional countermeasures are needed.

In light of the above, the third embodiment is constructed such that the standby power supply circuit 10 performs switching oscillation only when the voltage detection circuit 44 has detected that the input voltage falls within a range of DC 382V–DC 240V. If the switch 12 shown in FIG. 1 is set so that it is turned on when the standby power supply circuit 10 of FIG. 6 is turned on, the main power supply circuit 14 is operated only when the input power supply voltage falls within the range of DC 382V–DC 240V. Thus, the main power supply circuit 14 is prevented from degradation.

The example shown in FIG. 7 aims to stabilize the detection operation by using one end of the smoothing capacitor 10b as the voltage detecting point.

Figure 8:
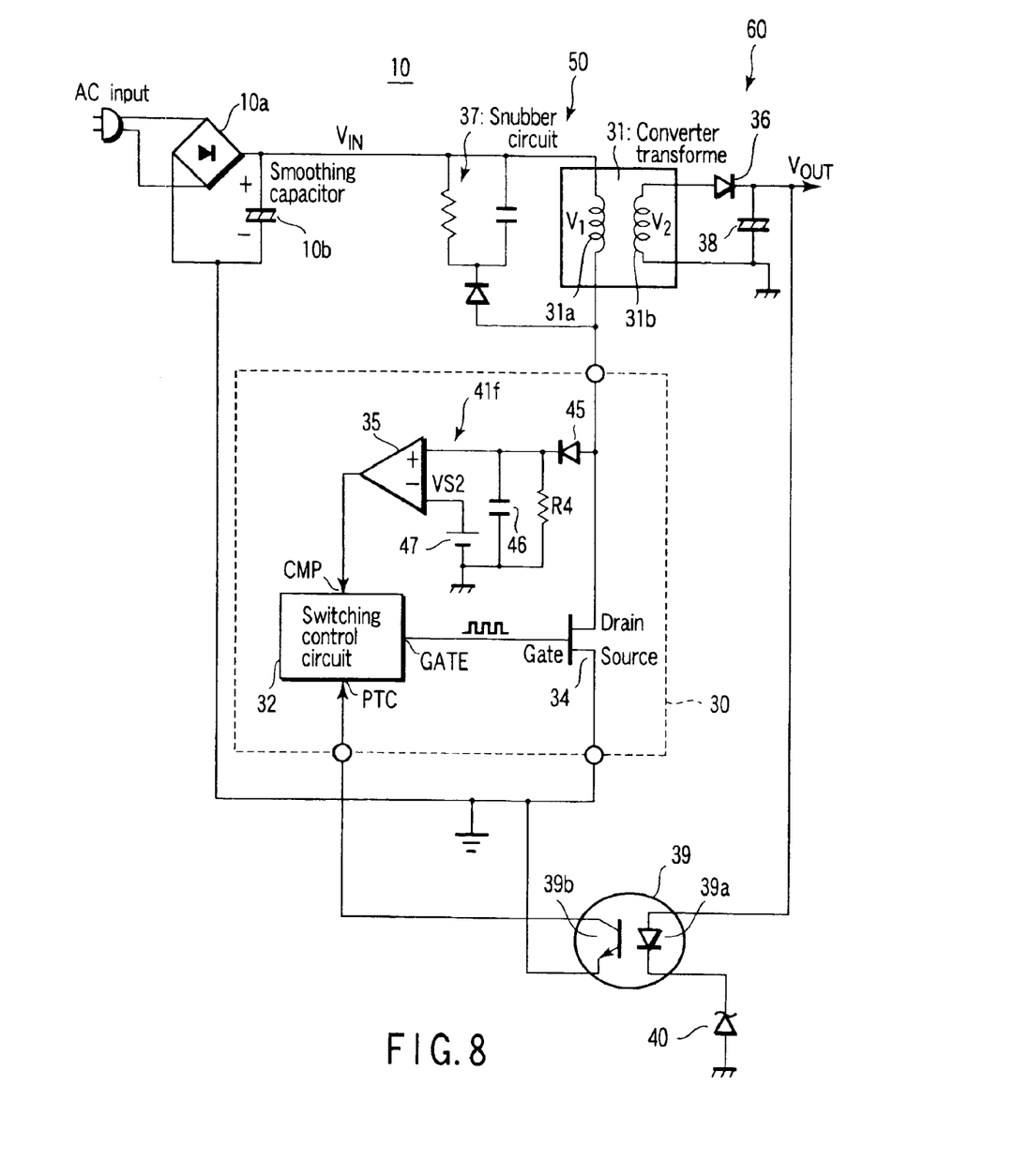
FIG. 8 is a circuit diagram illustrating a standby power supply circuit according to a fourth embodiment of the invention.

Further, FIG. 8 illustrates a surge voltage detection circuit 41f according to a fourth embodiment of the invention. A diode 45, resistor R4 and capacitor 46 form a peak hold circuit. The comparator 35 compares the voltage held by the peak hold circuit with a third stipulated voltage $V_{S2}$ generated by a third stipulated voltage generating section 47.

The surge voltage detection circuit 41f detects whether or not the momentary peak value of the drain voltage $V_D$ shown in FIG. 3 is higher than the third stipulated voltage. Accordingly, in this embodiment, the maximum drain voltage of the switching element FET 34, when the standby power supply circuit 10 is performing a switching operation, is detected, in addition to the drain voltage upon turn-on of the electronic device (before oscillation is started). Thus, oscillation is stopped before the maximum drain voltage exceeds the breakdown voltage of the FET 34.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A switching power supply circuit comprising:
    a direct-current-voltage generating circuit that generates an input direct-current voltage, the direct-current-voltage generating circuit including a rectifier circuit that rectifies an alternating-current power supply voltage and a smoothing capacitor that smoothes an output from the rectifier circuit;
    a converter transformer having primary and secondary windings, the input direct-current voltage being applied to an end of the primary winding;
    a switching element having a main current path and a control electrode, the main current path being connected between another end of the primary winding and a reference potential point, the switching element being turned on/off in response to a switching signal supplied to the control electrode;
    an output circuit which rectifies a voltage generated across the secondary winding of the converter transformer, thereby applying an output direct-current voltage to a load; and
    an integrated circuit that includes a switching control circuit and an oscillation control circuit, wherein
    (a) the switching control circuit, includes an oscillation circuit, and is configured to supply the switching element with the switching signal based on an oscillation operation of the oscillation circuit, and
    (b) the oscillation control circuit includes (i) a first comparator circuit that compares a first stipulated voltage with the input direct-current voltage generated at the other end of the primary winding and is applied to the switching element, the oscillation control circuit prohibiting an operation of the oscillation circuit of the switching control circuit if the input direct-current voltage is higher than the first stipulated voltage and (ii) a second comparator circuit that compares the input direct-current voltage generated at the other end of the primary winding and applied to the switching element with a second stipulated voltage that is lower than the first stipulated voltage, the oscillation control circuit prohibiting the operation of the oscillation circuit if the input direct-current voltage is lower than the second stipulated voltage, wherein the oscillation control circuit operates the oscillation circuit if input direct-current voltage falls within a range from the first stipulated voltage to the second stipulated voltage.

2. The switching power supply circuit according to claim 1, wherein the switching element is provided in the integrated circuit.

* * * * *